Patented Aug. 25, 1953

2,650,205

UNITED STATES PATENT OFFICE 2,650,205

ALKALINE-SETTING RESIN-STARCH REACTION PRODUCT AND METHODS OF PREPARATION THEREOF

Carl C. Kesler and Erling T. Hjermstad, Cedar Rapids, Iowa, assignors to Penick & Ford, Ltd., Incorporated, Cedar Rapids, Iowa, a corporation of Delaware No Drawing. Application September 12, 1950, Serial No. 184,512

16 Claims. (Cl. 260—9)

This invention relates to alkaline-setting resin-starch reaction product and methods of preparation thereof. More particularly, it pertains to the manufacture of a reaction product of undispersed starch and a resin capable of being polymerized to a water-insoluble state under alkaline conditions.

Reference is made to the copending application of Carl C. Kesler, Serial No. 60,641, filed November 17, 1948, now Patent Number 2,626,934.

As set out in said above application, when starch is gelatinized in the presence of small proportions of alkaline-setting resins, such as ketone-aldehyde resins or resorcinol-aldehyde resins, and sufficient alkaline materials to bring the pH of the paste somewhat higher than is necessary to set or harden the resin alone, the resulting paste or adhesive will develop a high degree of water insolubility when dried. These alkaline-setting resins were found to be very efficient in insolubilizing starch films, as little as from 2 to 5% on the starch being effective. This seems to indicate that such resins become chemically bound to the cooked or dispersed starch and when dried the starch-resin complex polymerizes to the insoluble state.

In the majority of commercial applications, starch is suspended in water and heated until the granules are gelatinized. The gelatinization of starch is a complex phenomenon which is not entirely understood at the present time. The term "gelatinization" as generally used means the swelling of the starch granules in a water suspension to the point where the suspension becomes a more or less clear, homogeneous, and gelatinous paste of dispersed starch granules.

It is known that starches derived from various species of plants become swollen when heated in water to certain specific temperature ranges. It is also known that some types of starch swell much more readily than others. The rate of swelling or gelatinization of starches and the rate of disintegration or breakdown of the swollen granules does not depend upon the temperature alone. Other factors which influence the rate of swelling and the breakdown of the swollen granules are chemical swelling agents and mechanical agitation.

When starches are heated in water to their specific gelatinization temperature range, a very great increase in the viscosity of the suspension is first obtained. As the heating is continued, a point is reached where the viscosity begins to drop and this fall in viscosity usually continues indefinitely as long as the paste is heated at a constant temperature above the gelatinization temperature range of the starch. Starches derived from different species of plants, or starches which have been chemically modified, show different rates of viscosity breakdown on continuous heating of their cooked pastes. The rate of viscosity breakdown will also be proportional to the degree of mechanical agitation and shearing forces to which the paste is subjected. Since in most commercial applications it is necessary to maintain the viscosity of the starch pastes within specified limits, users of starch have constantly sought starches which have the lowest rate of viscosity breakdown under their particular conditions of use. This is especially true in applications wherein the starch paste is recirculated by pumps for long periods of time through various types of adhesive transferring equipment, for example, machinery for forming corrugated board. In applications such as this, the viscosity breakdown of starch pastes on continuous recirculation and agitation constitutes a very real and serious problem and often results in delays in production schedules and poor quality of finished products. There has, therefore, been a need for a starch which will resist breakdown in viscosity after being gelatinized, especially under strongly alkaline or acidic conditions. Such a starch would find considerable acceptance by users of starch in a variety of industrial applications. However, although considerable knowledge is available concerning methods of modifying starches to increase their rate of gelatinization and granule dispersion, very little has been heretofore known about means of reducing gelatinization rates and stabilizing starch pastes against viscosity breakdown on agitation.

An object of the present invention is to prepare starches which after being gelatinized under neutral conditions in the absence of chemical swelling agents will retain a relatively constant paste viscosity when agitated at a constant temperature for long periods of time. Another object is the preparation of starches which when gelatinized in the presence of chemical swelling agents such as alkali, will be much more resistant to breakdown in paste viscosity on agitation than are the natural varieties of starch and their ordinary modifications. Another object is the preparation of starches which, when gelatinized and mixed with acids or both acid-setting resins and acidic catalysts, will resist breakdown in paste viscosity on agitation. A specific object is the preparation of starches which, when gelatinized in the presence of substantial proportions of alkali and then mixed with a large proportion of raw or unswollen unmodified starch, will retain a relatively constant viscosity on being recirculated through machinery used for the production of corrugated board. Other objects of the invention will be obvious as the specification proceeds.

We have discovered in addition to the discovery outlined in said application, Serial No. 60,641, regarding the insolubilization of gelatinized starch by means of small proportions of alkaline-setting resins that alkaline-setting resins will combine with starch which is either in the unswollen, filterable, granule state or hydrated only to the degree that substantially no birefringent crosses can be observed under polarized light in a microscope and substantially no dispersion or leaching of the granule constituents away from granule proper has occurred. We have discovered that by regulating the proportion of alkaline-setting resin which is combined with starch granules with a degree of hydration maintained within these limits, we can prepare starches which, after being substantially gelatinized with heat or chemical swelling agents, or both, are much more resistant to breakdown in paste viscosity on agitation over long periods of time than are the starches from which they are made. We have also discovered that extremely small proportions of alkaline-setting resins will produce very great increases in paste viscosity stability provided the resins are reacted or combined with starch granules which are not hydrated beyond the limits specified above.

The process by which these new products may be prepared consists of adding to a mixture of undispsersed granule starch and water a small amount of a water-soluble alkaline-setting resin, or necessary components for forming such resins, sufficient alkali to bring the pH of the suspension to within a range of 7.0 to 11.0, and heating the mixture at temperatures below the gelatinization temperature range of the starch. This general process may be carried out in a number of different ways. The resin may be reacted with the undispersed starch when it is suspended in water and the product used directly without further purification or drying, or the product may be dewatered, washed, and dried in standard starch processing equipment. In a different process, the starch may first be made alkaline and dewatered in a vacuum type rotary filter to a cake containing approximately 45% moisture and a solution of the resin sprayed on the surface and drawn into the cake by the vacuum. In this case the reaction is completed by passing the cake through a dryer at normal starch drying temperatures. A third variation of our general process is to intimately mix starch containing from 3 to 10% moisture with solutions containing the resin and alkali, agitating the mixture at temperatures below the gelatinization temperature range of the starch, and then evaporating out the excess water. Other variations of the process will be obvious to those skilled in the art.

We have found that the water-soluble, alkaline-setting resins will react with undispersed granule starch under the conditions described to yield products with increased stability of paste viscosity. The term "alkaline-setting resins" refers to such resins which, though still in the water-soluble state, may be further polymerized to a state of water-insolubility under alkaline conditions. Included are the water-soluble ketone-aldehyde resins, resorcinol-aldehyde resins, and phenol-aldehyde resins.

The term "undispersed granule starch" refers to starch granules which are hydrated only to a degree within the limits expressed as from the unswollen granule state to the point where substantially no birefringent crosses can be observed under polarized light in a microscope and substantially no dispersion or leaching of the granule constituents away from the granule proper has occurred. For example, when unmodified corn starch is heated in a neutral water suspension in the absence of chemical swelling agents of swelling inhibitors to the temperature at which its birefringent crosses disappear and then the addition of heat is stopped, the granules are in the undispersed state and are capable of functioning efficiently in the above described processes.

In general, the factors of concentration, pH, type and modification of resin, moisture present, and reaction temperature, etc. have an effect on the degree of paste-viscosity stabilization obtained by our process, and a proper balancing of conditions is necessary to achieve the most satisfactory result. For example, at lower reaction temperatures, the reaction mixture should be at a higher pH in order to obtain satisfactory stabilization. Therefore, in the different variations of our process, it is necessary to adjust these factors in such a manner that the degree of viscosity stabilization desired for certain specific applications is obtained. The degree of viscosity stabilization may be widely varied, depending on the proportion of resin combined with the starch granules. For some applications it is desired to have a product which will have increased viscosity stability after gelatinization in water which is neither strongly acid nor strongly alkaline. We have found that by reacting from .05 to .5% by weight of an acetone-formaldehyde resin with unswollen, unmodified corn starch, a product of this nature is obtained. In other applications, such as alkaline adhesives and the carrier portion of corrugating pastes, a product which will have increased viscosity stability when cooked in strongly alkaline conditions is desired. Since the rate of viscosity breakdown of gelatinized starch increases as the pH of the paste is made more alkaline, we have found that somewhat higher proportions of alkaline-setting resins must be combined with the unswollen starch in order to secure the desired viscosity stability when the product is gelatinized in alkali. Generally, we have found that from .5 to 2.0% by weight of an acetone-formaldehyde resin reacted with unswollen, unmodified corn starch yields products which have the desired viscosity stability when used in typical alkaline adhesive or corrugating paste formulation.

The degree to which the starch granules should be hydrated, within the limits specified above, depends on the subsequent processing or disposition of the reaction product. If the reaction product is to be dried and stored or shipped, it is convenient to react starch which is not hydrated beyond the filterable state. The reaction product may therefore be readily dewatered and dried in standard starch processing equipment. If the reaction product is to be used in its final application without dewatering and drying, the starch granules may be hydrated to a slightly greater degree.

The starch-alkaline setting resin reaction product is adapted for many commercial applications. Close control of viscosity is essential during the application of textile warp sizes, textile printing pastes, textile finishing, etc. The paste viscosity stability characteristics which may be imparted to starch by our process increase the utility of starches for these and other applications.

The following are examples of the process of stabilizing starches against viscosity breakdown, and are intended to illustrate but not limit our invention:

EXAMPLE 1

To a water suspension of unmodified corn starch containing 42.5% of starch solids is added .3% of sodium hydroxide and .25% of acetone-formaldehyde resin solids based on the starch. This resin is made by the Bakelite Corporation and is designated as BR 16648. The suspension is agitated for 2 to 4 hours at 125° F., then the starch is neutralized to pH 6.5 with hydrochloric acid, dewatered in a filter, washed free of salt, and dried. This product, when tested in a Corn Industries Viscometer, using 100 grams of the product per 1000 grams of a water suspension adjusted to pH 6.5, a propeller speed of 60 R. P. M., and a paste temperature of 211° F., showed a viscosity of 1192 gram-centimeters after 1 hour and 1152 gram-centimeters after 2 hours, or a breakdown viscosity of 40 gram-centimeters between 1 and 2 hours. A suspension of commercial unmodified corn starch under the same conditions showed a viscosity of 548 gram-centimeters after 1 hour and 428 gram-centimeters after 2 hours, or a breakdown in viscosity of 120 gram-centimeters between 1 and 2 hours. A description of the Corn Industries Viscometer and procedure for testing viscosity of starches is given in the Analytical Edition of the Journal of Industrial and Engineering Chemistry, volume 19, page 16, January 15, 1947.

EXAMPLE 2

To 1000 grams of commercial corn starch containing .2% sodium hydroxide is added 5 grams of acetone-formaldehyde resin (Resin No. BR 16648 made by Bakelite Corporation) diluted with 50 grams of water. The starch is then alternately kneaded and passed through screens until a uniform dispersion of the resin solution in the starch is obtained. The mixture is then heated in a dough mixer to 180° F., held at this temperature for 15 minutes, and then cooled. This product, when tested in a Corn Industries Viscometer, using 100 grams of the product per 1000 grams of a water suspension adjusted to pH 6.5, a propeller speed of 60 R. P. M., and a paste temperature of 211° F., showed a viscosity of 1240 gram-centimeters after 1 hour and 1200 gram-centimeters after 2 hours, or a breakdown in viscosity of 40 gram-centimeters between 1 and 2 hours in the viscometer.

EXAMPLE 3

To a water suspension of unmodified corn starch containing 43% of starch solids is added .3% of sodium hydroxide and 1.0% of acetone-formaldehyde resin based on the starch. (This is Resin No. BR 16648, made by Bakelite Corporation). The suspension is agitated at 130° F. for 2 to 4 hours, then dewatered and dried. This product when used as the carrier portion in the following corrugating starch formula produced a corrugating adhesive of good viscosity stability.

Carrier portion 150 lbs. of resin starch
2602 lbs. water
Heat starch and water to 120° F.
Add 25 lbs. caustic soda in 82 lbs. water
Hold at 120° F. for 10 minutes
Add 25 lbs. borax
Cool to 115° F.

Uncooked portion 825 lbs. unmodified corn starch
1216 lbs. cold water

The carrier and uncooked portions were mixed and the resulting paste run in a Langston Corrugator using .016 joint jute liners and .009 straw as the medium. No additional freshly-prepared paste was added during this run. The single face and double backer roll settings were .012 inch and the operating speed used was 300 to 325 feet per minute. The viscosity of the paste was measured at intervals using a Penick and Ford corrugating viscometer, an orifice type viscosimeter with a water time of 18.5 to 19.5 seconds at 75° F. The viscosities of samples taken from the return line over a period of 2 hours were:

| Time Run | Viscosity |
| --- | --- |
|  | Seconds |
| Initial | 45 |
| 25 minutes | 48 |
| 50 minutes | 52 |
| 80 minutes | 54 |
| 95 minutes | 48 |
| 120 minutes | 48 |

During corrugating runs made under the same conditions, using standard starches in the carrier portion, viscosity breakdown of from an initial viscosity of 45 seconds to 25 to 30 seconds is ordinarily obtained.

EXAMPLE 4

This example illustrates the use of alkaline-setting resin in the formulation of an acidic corrugating adhesive. In this formula the acetone-formaldehyde resin is reacted with ungelatinized starch to stabilize the carrier starch against viscosity breakdown, while the urea-formaldehyde resin is added to the carrier portion after gelatinization for the sole purpose of imparting a degree of water insolubility to the corrugating paste on drying. The corrugating paste is made as follows:

Carrier portion

Cold water, 200 lbs.
Unmodified corn starch, 200 lbs.
2 lbs. of caustic soda dissolved in 45 lbs. of water is added slowly
Add acetone-formaldehyde resin—4⅓ lbs.
(Resin No. BR 16648, made by Bakelite Corporation)
Warm to 130° F. and hold at 130° F. for 15 to 30 minutes
Add water, 2215 lbs.
Heat to 190° F.
Neutralize to pH 6 (approximately) with alum $(Al_2(SO_4)_3)$
Add urea-formaldehyde resin, 100 lbs.
(Uformite 430, made by Rohm and Haas Company)
Add alum $(Al_2(SO_4)_3)$ to pH 4.0
Hold at 190° F. for 15 to 20 minutes
Cool to 150° F.

Uncooked portion

| | Pounds |
|---|---|
| Unmodified corn starch | 1250 |
| Cold water | 1400 |

The carrier and uncooked portions are then mixed and agitated until uniform viscosity for machine operation is obtained. This corrugating paste was run in a Langston Corrugator. The viscosity at the start of the run was 40 seconds, as measured by a Penick and Ford Viscometer, an orifice type viscosimeter with a water time of 18.5 to 19.5 seconds at 75° F. After 6 hours of constant circulation through the corrugating machine, the viscosity was 37 seconds. During corrugating runs using the above formulation but no acetone-formaldehyde resin, a viscosity breakdown of from 40 to 50 seconds to about 20 to 25 usually occurs within 2 hours.

EXAMPLE 5

To a water suspension of unmodified corn starch containing 45% of starch solids is added 1.0% of resorcinol-formaldehyde resin solids and 0.3% of formaldehyde based on the starch, and sufficient sodium hydroxide to bring the pH of the suspension to 11.0. The resorcinol formaldehyde resin is supplied by the Bakelite Corporation and is designated as QC-17626. The suspension is agitated for 6 hours at 130° F., neutralized to pH 6.0 with hydrochloric acid, then dewatered in a suction filter, and the starch cake dried to approximately a 10% moisture content. This product, when tested in a Corn Industries Viscometer, using 100 grams of the product per 1000 grams of a water suspension adjusted to pH 6.5, a propeller speed of 60 R. P. M. and a paste temperature of 211° F., showed a viscosity of 800 gram-centimeters after 1 hour and 712 gram-centimeters after 2 hours, or a breakdown in viscosity of 88 gram-centimeters between 1 and 2 hours.

EXAMPLE 6

To a water suspension of unmodified corn starch containing 45% starch solids is added 1.0% of phenol-formaldehyde resin solids and .3% formaldehyde based on the starch, and sufficient sodium hydroxide to bring the pH of the suspension to 8.5. The phenol-formaldehyde resin is supplied by Reichold Chemical Company and is designated as Plyophen 6000. The suspension is agitated for 16 hours at 80° F., then dewatered in a suction filter, the starch cake dried to approximately a 10% moisture content, and heated for four hours at a temperature of 150° F. This product, when tested in a Corn Industries Viscometer, using 100 grams of the product per 1000 grams of a water suspension adjusted to pH 6.5, a propeller speed of 60 R. P. M., and a paste temperature of 211° F., showed a viscosity of 660 gram-centimeters after 1 hour in the viscometer and 580 gram-centimeters after 2 hours, or a breakdown in viscosity of 80 gram-centimeters between 1 and 2 hours.

While, in the foregoing specification, we have set out certain examples in considerable detail for the purpose of illustrating embodiments of the invention, it will be understood that such details may be varied widely by those skilled in the art without departing from our invention.

We claim:

1. In a process for preparing from alkaline setting resins and granule starch a reaction product characterized by being susceptible to gelatinization to form pastes having stabilized viscosities, the step of reacting granule starch in a water medium at a pH from 7.0 to 11.0 with from .05 to 2.0% on a starch basis of a water-soluble alkaline setting resin selected from the group consisting of ketone-aldehyde resins, resorcinol-aldehyde resins, and phenol-aldehyde resins, by heating said reactants, at temperatures below the normal gelatinization temperature range of the starch, said starch granules being at no time hydrated to the degree that substantial leaching out of the granule constituents into the water occurs.

2. The process of claim 1 in which the alkaline-setting resin is a ketone-aldehyde resin.

3. The process of claim 1 in which the alkaline-setting resin is a resorcinol-aldehyde resin.

4. The process of claim 1 in which the alkaline-setting resin is a phenol-aldehyde resin.

5. The process of claim 1 in which the alkaline-setting resin is acetone-formaldehyde resin.

6. In a process of preparing from granule starch and alkaline-setting resins a reaction product characterized by being susceptible to gelatinization to form pastes having stabilized viscosities, the steps of intimately mixing substantially dry granule starch containing soluble alkali and from 3% to 10% moisture with .05% to 2.0% of a water soluble alkaline-setting resin based on the starch, said resin being selected from the group consisting of ketone-aldehyde resins, resorcinol-aldehyde resins, and phenol-aldehyde resins, and heating said mixture under non-gelatinizing conditions without any substantial leaching out of the constituents of the starch granules.

7. In a process of preparing from granule starch and alkaline-setting resins a reaction product characterized by being susceptible to gelatinization to form pastes having stabilized viscosity, the steps of intimately mixing substantially dry, undispersed, granule starch containing soluble alkali and from 3% to 10% of moisture with a water solution of a water soluble alkaline-setting resin containing from .05% to 2.0% resin solids based on the starch, said resin being selected from the group consisting of ketone-aldehyde resins, resorcinol-aldehyde resins, and phenol-aldehyde resins, and drying the mixture with heat at non-gelatinizing temperatures below the temperature at which substantial leaching out of the granule constituents into the water occurs.

8. In a process of preparing from granule starch and alkaline setting resins a reaction product characterized by being susceptible to gelatinization to form pastes having stabilized viscosities, the steps of intimately mixing undispersed, granule starch with water, from .05 to 2.0% of a water-soluble alkaline-setting resin based on the starch, and sufficient alkali to produce a pH of from 7.0 to 11.0 in the mixture, and drying the mixture with heat at non-gelatinizing temperatures below the temperature at which substantial leaching out of the granule constituents into the water occurs said resin being selected from the group consisting of ketone-aldehyde resins, resorcinol-aldehyde resins, and phenol-aldehyde resins.

9. The reaction product of undispersed, granule starch and .05 to 2.0% of a water-soluble alkaline-setting resin prepared by the process of claim 1.

10. The reaction product of undispersed, granule starch and .05 to 2.0% of a water-soluble ketone-aldehyde resin prepared by the process of claim 2.

11. The reaction product of undispersed, granule starch and .05 to 2.0% of a water-soluble resorcinol-aldehyde resin prepared by the process of claim 3.

12. The reaction product of undispersed, granule starch and .05 to 2.0% of a water-soluble phenol-aldehyde resin prepared by the process of claim 4.

13. The reaction product of undispersed, granule starch and .05 to 2.0% of a water-soluble acetone-formaldehyde resin prepared by the process of claim 5.

14. In a process for preparing from granule starch and alkaline-setting resins a reaction product characterized by being susceptible to gelatinization to form pastes having stabilized viscosities, the steps of preparing a mixture of starch in the granule form in a water medium at a pH of 7.0 to 11.0 with from .05% to 2.0% on a starch basis of a water-soluble alkaline-setting resin selected from a group consisting of ketone-aldehyde resins, resoricinol-aldehyde resins, and phenol-aldehyde resins, and heating said mixture at non-gelatinizing temperatures below the temperature at which substantial leaching out of the granule constituents into the water occurs.

15. In a process for preparing from granule starch and alkaline-setting resins a reaction product characterized by being susceptible to gelatinization to form pastes having stabilized viscosities, the steps of intimately mixing granule starch with water, from .05% to 2.0% on a starch basis of a water-soluble resin selected from a group consisting of ketone-aldehyde, resorcinol-aldehyde, and phenol-aldehyde resins, and sufficient alkali to produce a pH of 7.0 to 11.0 in the mixture, and drying the mixture with heat at non-gelatinizing temperatures below the temperature at which substantial leaching out of the granule constituents into the water occurs.

16. In a process for preparing from alkaline setting resins and granule starch a reaction product characterized by being susceptible to gelatinization to form pastes having stabilized viscosities, the step of reacting filterable, granule starch in a water medium at a pH from 7.0 to 11.0 with from .05 to 2.0% on a starch basis of a water-soluble alkaline setting resin selected from the group consisting of ketone-aldehyde resins, resorcinol-aldehyde resins and phenol-aldehyde resins by heating said reactants under non-gelatinizing conditions, said starch granules being at no time hydrated to the degree that leaching out of the granule constituents away from the granule proper occurs so that said starch granules remain in filterable condition upon completion of said reaction.

CARL C. KESLER.
ERLING T. HJERMSTAD.

References Cited in the file of this patent

UNITED STATES PATENTS

| Number | Name | Date |
|---|---|---|
| 2,053,850 | Sturken | Sept. 8, 1936 |
| 2,318,560 | Ripper | May 4, 1943 |
| 2,362,086 | Myers et al. | Nov. 7, 1944 |
| 2,407,071 | Gill et al. | Sept. 3, 1946 |
| 2,489,170 | Wooster et al. | Nov. 22, 1949 |
| 2,529,851 | Scnutchfield | Nov. 14, 1950 |
| 2,626,934 | Kesler | Jan. 27, 1953 |